(No Model.)

C. W. HUNT.
RAILROAD.

No. 468,110. Patented Feb. 2, 1892.

Witnesses
Chas. H. Smith
J. Staib

Inventor
Charles W. Hunt
per Lemuel W. Serrell
Atty

UNITED STATES PATENT OFFICE.

CHARLES W. HUNT, OF WEST NEW BRIGHTON, NEW YORK.

RAILROAD.

SPECIFICATION forming part of Letters Patent No. 468,110, dated February 2, 1892.

Application filed June 29, 1891. Serial No. 397,808. (No model.)

*To all whom it may concern:*

Be it known that I, CHARLES W. HUNT, a citizen of the United States, residing in West New Brighton, in the county of Richmond and State of New York, have invented an Improvement in Railroads, of which the following is a specification.

In mining operations, quarries, coal-depots, &c., cars have been made use of in which the flanges of the wheels have been applied at the outsides of such wheels, as the same are found especially advantageous in causing the cars to travel upon curves of a short radius; and my present improvement is especially available with car-wheels having their flanges at the outer sides of such wheels.

Figure 1:
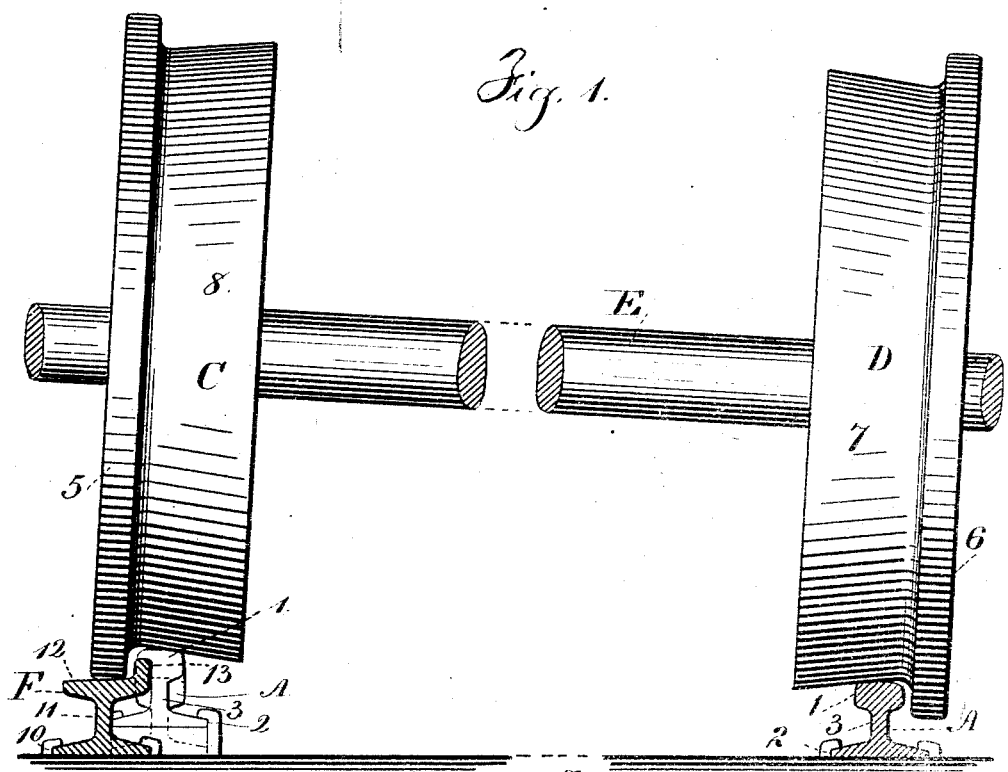
Figure 2:
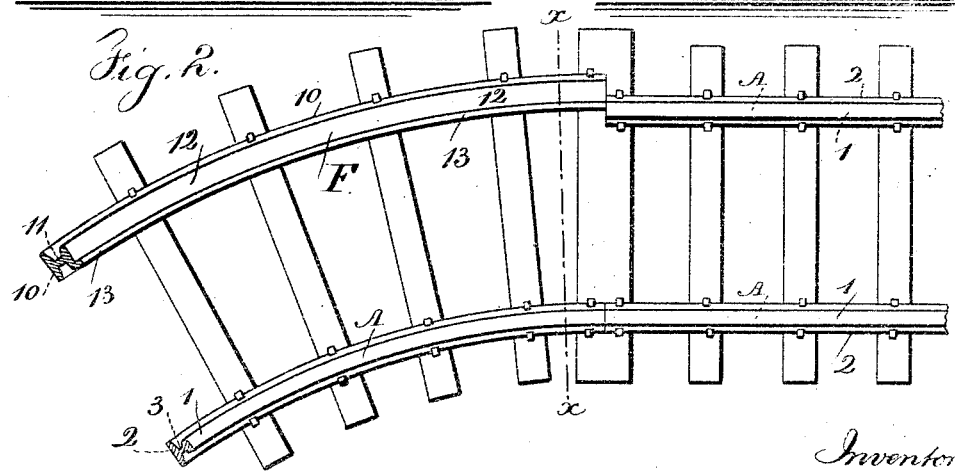

In the drawings, Figure 1 is a cross-section of a track fitted with my improvement at the line $x$ $x$ of Fig. 2; and Fig. 2 is a plan view, on a smaller scale, of part of the rails of a curve.

The track-rail A is of usual character, having the head 1, flange or tread 2, and body 3, and a rail of this character is laid at each side of the track upon the straight portion thereof, and at C D, I have represented a pair of wheels united by the axle E and having the flanges 5 and 6 on the outer edges of the wheels and the tread portions 7 and 8 of the wheels tapering or conical with the large diameters inwardly.

My improved rail F is made with a base or tread 10 and a body 11, which correspond, generally, to the base 2 and body 3 of the rail A; but instead of the head upon such rail I provide the flat bearing 12, having an upwardly-extending guide-flange 13 at one edge thereof, and in laying the track the parts are placed so that the flange 13 is at the inner side of the outer rail of the curve, and when the wheels of the cars run upon such curve the flange 5 of the wheel C moves at its edge upon the surface of 12 and the tread 8 of said wheel is raised above the top edge of the guide-flange 13. Hence the car-wheels are adapted to travel upon a curved track of a small radius, because of the larger diameter of the edge of the flange of the wheel C becoming the bearing and traveling upon the top of the rail F, and it will be noticed that the wheels cannot run off the track, because the guide-flange 13 becomes a stop in one direction for the flange 5 of the wheel C and the rail A becomes a stop in the other direction for the flange 6 of the wheel D, and one wheel D traveling upon its conical tread and the other wheel C traveling upon the periphery of its flange will accommodate themselves to a curve of a given radius, because if the tendency of the wheel D should be to run off the outside of the track the larger diameter of the conical tread will come upon the rail and tend to bring the flange 6 toward the rail again.

In my improvement there is no weight taken upon the edge of the flange 13, because the flange 5 of the wheel C rests upon the flat surface of the top of the rail.

I claim as my invention—

The combination, with the car-wheels having external flanges, of track-rails against the outer edges of which the wheel-flanges run, and a curved track-rail F, having a flat surface for the flange of the outer wheel, and an upward flange 13 at the inner edge of the outer rail of the curved track, substantially as set forth.

Signed by me this 24th day of June, 1891.

CHAS. W. HUNT.

Witnesses:
GEO. T. PINCKNEY,
WILLIAM G. MOTT.